US009686284B2

(12) United States Patent
Shah et al.

(10) Patent No.: US 9,686,284 B2
(45) Date of Patent: Jun. 20, 2017

(54) EXTENDING AND RE-USING AN IP MULTIMEDIA SUBSYSTEM (IMS)

(71) Applicant: T-Mobile USA, Inc., Bellevue, WA (US)

(72) Inventors: Mehul Shah, Bellevue, WA (US); Cameron Byrne, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 396 days.

(21) Appl. No.: 13/789,559

(22) Filed: Mar. 7, 2013

(65) Prior Publication Data

US 2014/0259127 A1  Sep. 11, 2014

(51) Int. Cl.
*G06F 15/16* (2006.01)
*H04L 29/06* (2006.01)

(52) U.S. Cl.
CPC ...... *H04L 63/0884* (2013.01); *H04L 65/1016* (2013.01); *H04L 65/1073* (2013.01); *H04L 63/168* (2013.01)

(58) Field of Classification Search
CPC .......................... H04L 63/0884; H04L 63/168
USPC ............ 726/5, 4, 7; 709/203, 226, 227, 217; 455/466, 418; 370/395.3, 329, 328
See application file for complete search history.

(56) References Cited

U.S. PATENT DOCUMENTS

| | | | |
|---|---|---|---|
| 2004/0128542 A1* | 7/2004 | Blakley, III | H04L 63/0281 726/12 |
| 2006/0021019 A1* | 1/2006 | Hinton | G06F 21/41 726/10 |
| 2009/0113523 A1* | 4/2009 | Vedula | H04L 63/0815 726/4 |
| 2009/0210536 A1* | 8/2009 | Allen et al. | 709/227 |
| 2010/0048195 A1* | 2/2010 | Zhu | 455/418 |
| 2011/0096746 A1* | 4/2011 | Belling | H04L 65/1073 370/329 |
| 2011/0299462 A1* | 12/2011 | Imbimbo et al. | 370/328 |
| 2012/0023556 A1* | 1/2012 | Schultz et al. | 726/4 |
| 2014/0126714 A1* | 5/2014 | Sayko | 379/265.09 |
| 2014/0223452 A1* | 8/2014 | Santhanam et al. | 719/328 |
| 2014/0297879 A1* | 10/2014 | Gao et al. | 709/227 |

* cited by examiner

*Primary Examiner* — Thuong Nguyen
(74) *Attorney, Agent, or Firm* — Perkins Coie LLP

(57) ABSTRACT

Systems and methods for extending and re-using an IP multimedia subsystem (IMS) to extend the trust relationship from a closed group of customers of wireless service providers to users of other ecosystems (e.g., Gmail, Facebook, or Yahoo!) for IMS services. Some embodiments include receiving a request from an initiating device to establish a service connection between the initiating device and an endpoint through an Internet Protocol Multimedia Subsystem (IMS) session. The request may include third-party domain credentials (e.g., maintained by a third-party domain) associated with an end-user. The third-party domain credentials can be extracted from the request. Communications with the third-party domain can be used to verify the third-party domain credentials. The IMS session can be established between the initiating device and the endpoint upon verification of the third-party domain credentials.

21 Claims, 7 Drawing Sheets

EXTENDING AND RE-USING AN IP MULTIMEDIA SUBSYSTEM (IMS)

BACKGROUND

The IP Multimedia Subsystem (IMS) is an architectural framework for delivering Internet Protocol (IP) multimedia to mobile users over various types of wireless and fixed networks. Through advancements in wireless access technologies, IP-based communications for multimedia application services became available for various types of mobile devices. Subscribers of second and third generation mobile communication networks are offered application services which require access to special network subsystems such as the IMS. Examples of such application services include white board discussions, video conferencing, Push to talk over Cellular (PoC), Voice over IP (VoIP), real-time content sharing including video/audio files, instant messaging, interactive gaming, and the like.

An important component of IMS based service delivery is the availability of clients on end-user devices. These IMS clients are often tailored to suit the specific needs of service providers and require custom development to make them interoperate with the IMS core network. This means expending time and effort to build custom clients, often at the expense of time to market of these services. As such, there are a number of challenges and inefficiencies found in traditional IMS based service delivery.

BRIEF DESCRIPTION OF THE DRAWINGS

Embodiments of the present invention will be described and explained through the use of the accompanying drawings in which.

Figure 1:
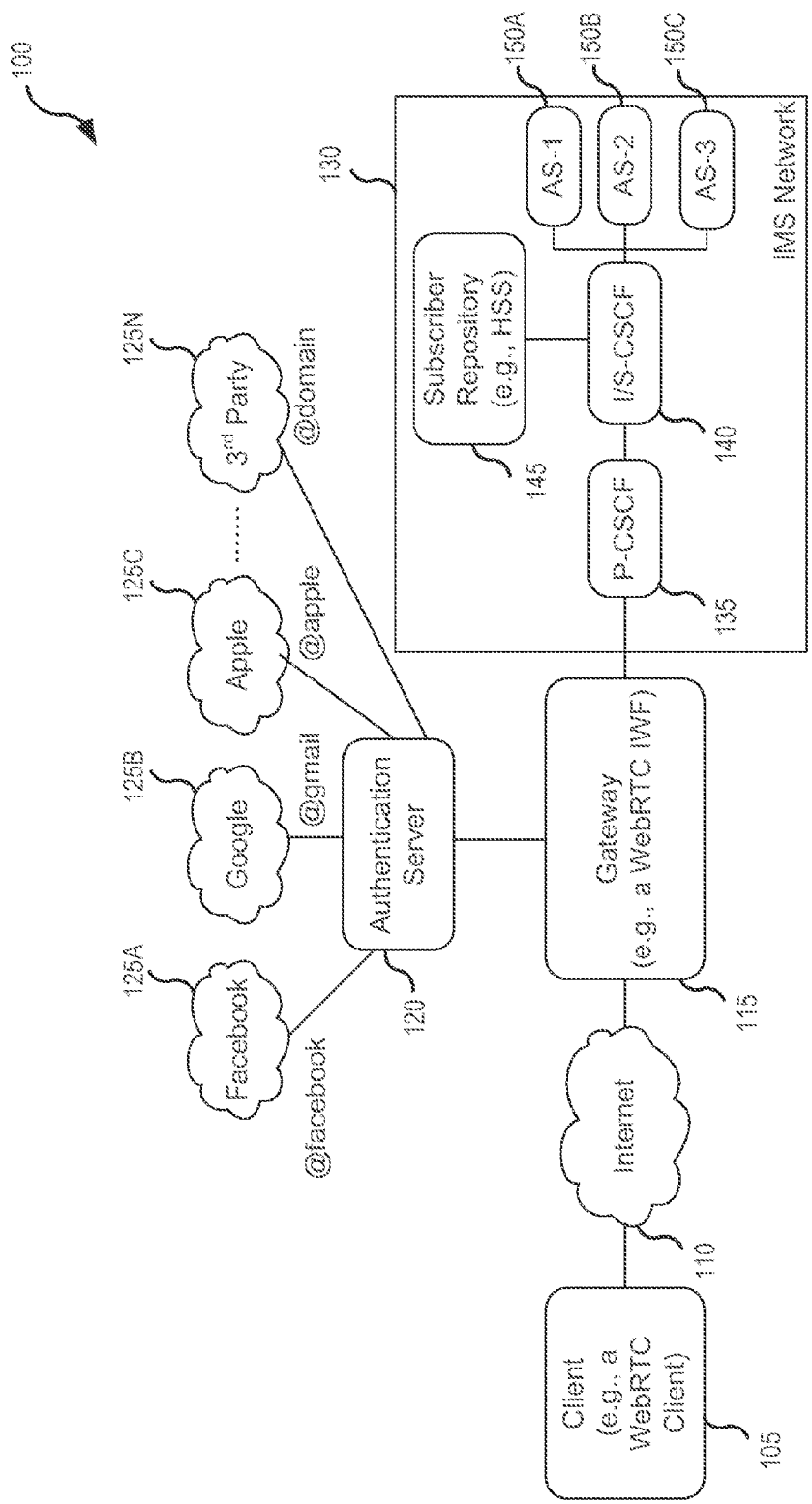
FIG. 1 illustrates an example of a communications environment in which some embodiments of the present invention may be utilized.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

As noted above an important component of IMS based service delivery is the availability of clients on end-user devices. These IMS clients are often tailored to suit the specific needs of service providers and require custom development to make them interoperate with the IMS core network. Since the IMS domain relies on a trusted relationship between the network and the end-user, the IMS services are marketed and offered to the operator's own subscribers (i.e., trusted and known) thereby limiting the number of users that can potentially utilize and be eligible for these services.

In contrast, various embodiments of the present invention extend the trust relationship from the closed group of customers of the service providers to a potential limitless base (e.g., users of other ecosystems such as Gmail, Facebook, or Yahoo!) for these IMS services. A generic client (e.g., Web real time communications (RTC) client) may be used to expose an operator's IMS service offerings to users or IP endpoints associated with these third-party ecosystems. In some embodiments, for example, the generic client receives the third-party domain credentials from the user. These credentials are passed to a gateway as part of a request to establish the service. When the gateway receives the request, the third-party domain credentials are extracted and authenticated with secure communications with the third-party domain. The authentication from the third-party domain is used to establish an IMS session without the need for further validation of the end-user's credentials based on a trust relationship between the gateway and the IMS network. As a result, the mobile network operators stand to benefit by monetizing these services to a larger customer base.

In the following description, for the purposes of explanation, numerous specific details are set forth in order to provide a thorough understanding of embodiments of the present invention. It will be apparent, however, to one skilled in the art that embodiments of the present invention may be practiced without some of these specific details. Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present invention, and may be included in more than one implementation. In addition, such phrases do not necessarily refer to the same embodiments or different embodiments.

FIG. 1 illustrates an example of a communications environment 100 in which some embodiments of the present invention may be utilized. As illustrated in FIG. 1, communications environment 100 may include one or more clients 105 (such as a mobile phone, tablet computer, mobile media device, mobile gaming device, vehicle-based computer, etc.), Internet 110, gateway 115, authentication server 120, one or more third-party domains 125A-125N, and IMS network 130. It will be appreciated that communications environment 100 may include one or more networks that correspond to a number of IP-based and other networks such as the Internet, DSL networks, public switched telephone networks (PSTN) and other wire-line networks (e.g., SS7-based networks), wireless networks such as those using CDMA, GSM, IEEE 802.11x, and/or UMTS communications or the like, and local area networks. For example, Internet 110 may be interfaced with other networks through various access gateway servers (not shown) such as a Gateway GPRS Support Node (GGSN) for General Packet Radio Service (GPRS), a Packet Data Gateway (PDG) for WiFi, Systems Architecture Evolution Gateway (SAE-GW) or a Packet Data Network Gateway (PDN-GW) for 3GPP Long Term Evolution (LTE), and the like.

To ease the integration of IMS network 130 with Internet resources, various specifications (e.g., 3GPP specifications) use Internet Engineering Task Force protocols within IMS network 130. An example of one such protocol is session initiation protocol (SIP). SIP is a signaling protocol used for creating, modifying and terminating two-party or multiparty sessions consisting of one or several media streams. Endpoints must register with IMS network 130 in order to use IMS services. Traditionally, a mobile device, or other endpoint, registers its IP address with a SIP registrar server within IMS network 130 by generating and sending a SIP request message with a "REGISTER" method token. The IMS network 130 handles the authentication. Once registered, the mobile device may subsequently establish multimedia sessions via IMS network 130. In contrast, the embodiments illustrated in FIG. 1 rely on a trust relationship between gateway 115 and IMS network 130 for authentication. Once users have been authenticated and registered in IMS network 130, gateway 115 is in the path for all signaling events from the endpoints and translates events (e.g., WebRTC) into SIP messages towards IMS network 130.

As illustrated in the embodiments shown in FIG. 1, client 105 (e.g., a WebRTC client) may be configured to access gateway 115 (e.g., a WebRTC interworking function) through internet 110 in order to establish an IMS service between two endpoints. Client 105 may reside on a target device or endpoint (e.g., laptop, PC, tablet, smartphone, or Internet connected TV) and communicates with a gateway 115 using a secure communications protocol (e.g., HTTPs) over internet 110. An end-user ("user") can use client 105 to enter credentials (e.g., username, password) for authentication. The username can be of any form such as an email address, a session initiation protocol uniform resource identifier (SIP URI), a TEL URI, or any other set of credentials.

Gateway 115 (e.g., WebRTC IWF) can terminate secure HTTPs sessions from Internet facing devices and communicate to the IMS network using a Session Initiation Protocol (SIP). A trust relationship exists between gateway 115 and IMS network 130. This trust relationship allows SIP REGISTER messages to be processed at a proxy control session control function (P-CSCF) 135. Gateway 115 may also interface with authentication server 120 to delegate the responsibility of authentication of credentials supplied by the device/user for the case when the supplied username does not belong to the IMS domain operator. In some embodiments, authentication server 120 interfaces with the third-party domain 125A-125N that owns the identity supplied by the user (username). Authentication server 120 may use proprietary or existing identity management protocols (e.g., OAuth). The authentication status is relayed back to gateway 115.

Gateway 115 can receive the authentication status and initiate communication with IMS network 130 if and only if the user has been successfully authenticated by authentication server 120. P-CSCF 135 may be a SIP proxy which resides with IMS network 130. Once the user credentials have been successfully authenticated, the gateway 115 originates a SIP REGISTER message on behalf of the user. P-CSCF 135 has a trust relationship with gateway 115 and asserts that the registration request originates from the trusted source. In some embodiments, the assertion that the registration request originates from the trusted source may be embedded within the SIP REGISTER request by P-CSCF 135. This may include inserting private headers (P-headers) into the SIP REGISTER message before forwarding the request onto the serving control session control function (S-CSCF) 140.

S-CSCF 140 can then inspect the SIP REGISTER message. When S-CSCF 140 determines the register message contains the P-CSCF assertion that the message originated from a trusted source, S-CSCF 140 may suspend the challenge of the register message and implicitly register the user whose identity is contained in the register message. S-CSCF 140 may then contact the subscriber repository 145 and download a generic Initial Filter Criteria (iFC). In accordance with various embodiments, the iFC tells S-CSCF 140 which and in what order the application servers 150A-150C need to be contacted for service delivery. If the provided user identity is wireless/network operator controlled, subscriber repository 145 proceeds in the normal way and provides the actual filter criteria (and not the generic filter criteria) to S-CSCF 140.

Subscriber repository 145, coupled to S-CSCF 140, may be a master user database containing the subscription-related information (subscriber profiles) that supports IMS network 130. Subscriber repository 145 may also perform authentication and authorization of the user, and can provide information about the subscriber's location and IP information. The subscriber repository 145 may be a home subscriber server that can create a temporary binding between the provided user identity and the registration state.

Figure 2:
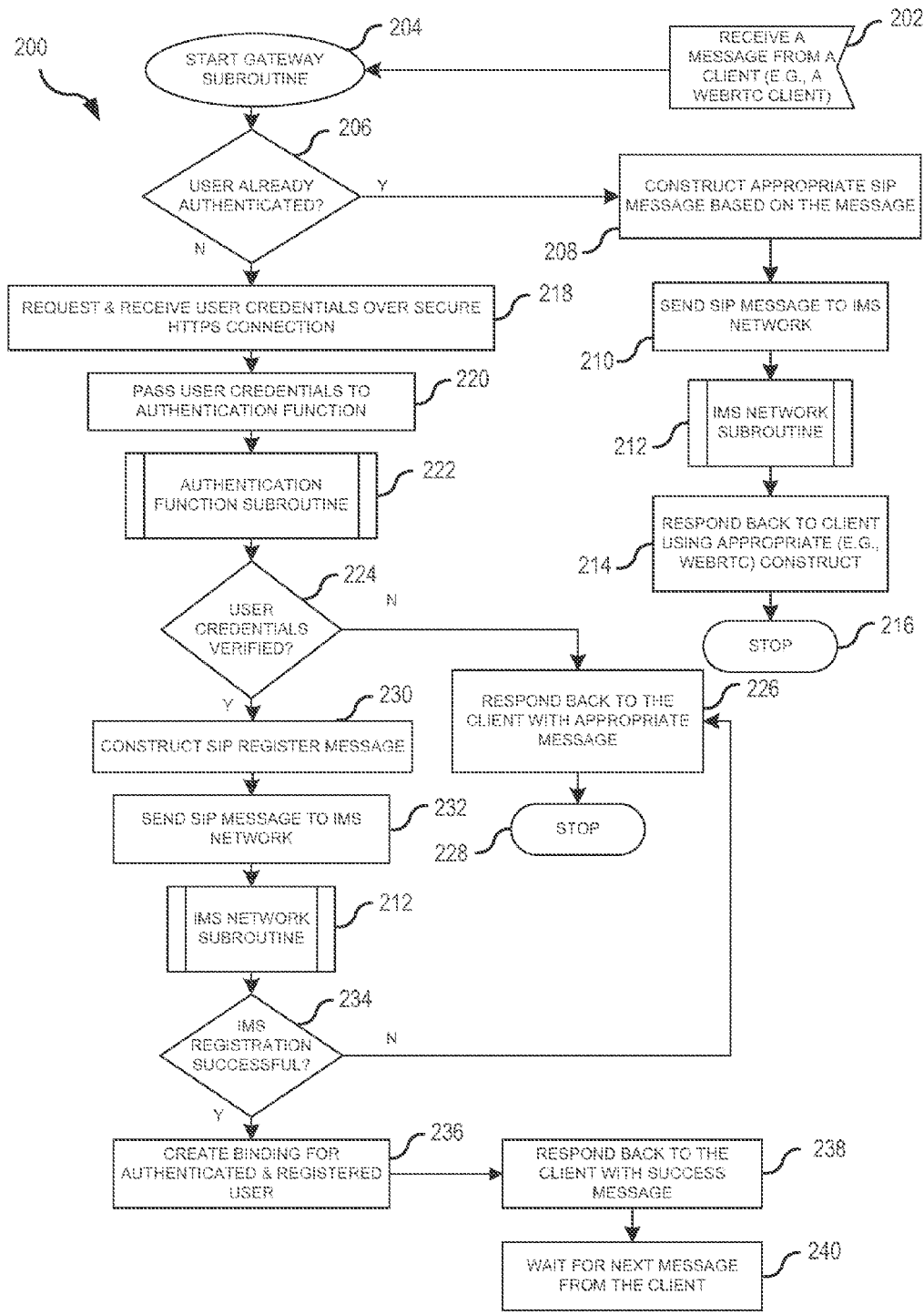
FIG. 2 is a flowchart illustrating a set of operations for operating a gateway in accordance with some embodiments of the present invention.

FIG. 2 is a flowchart illustrating a set of operations 200 for operating gateway 115 in accordance with some embodiments of the present invention. As illustrated in FIG. 2, receiving operation 202 receives an input from a client (e.g., WebRTC client). Initiation operation 204 starts the gateway subroutine. Determination operation 206 determines whether the user, identified in the input from the client, has already been authenticated. If determination operation 206 determines that the user has already been authenticated, then determination operation 206 branches to construction operation 208 where an appropriate SIP message is constructed based on the message received from the client. Sending operation 210 sends the SIP message to the IMS network and the IMS network subroutine (see FIG. 4) is activated during IMS activation operation 212. When a response is received from the IMS network subroutine, response operation 214 responds back to the client using the appropriate messaging protocols before ending the gateway subroutine during stopping operation 216.

If determination operation 206 determines that the user is not already authenticated, then determination operation 206 branches to request operation 218, where the user credentials are requested and received over a secure connection (e.g., HTTPS). Passing operation 220 then passes the user credentials to an authentication server where authentication activation operation 222 activates the authentication function subroutine (see FIG. 3) where the user credentials are verified.

When a response is receive from the authentication server regarding the verification of the user credentials, credential verification determination operation 224 determines whether the user credentials were verified. If credential verification determination operation 224 determines the user credentials were not verified, then credential verification determination operation 224 branches to response operation 226 where a response is sent back to the client indicating the user credentials were not verified before ending the gateway subroutine during stopping operation 228. If credential verification determination operation 224 determines the user credentials were verified, then credential verification determination operation 224 branches to construction operation 230 where an appropriate SIP REGISTER message, e.g. as described herein, is constructed.

Sending operation 232 sends the SIP REGISTER message to the IMS network where IMS network subroutine (see FIG. 4) is activated during IMS activation operation 212. When a response is received from the IMS network, registration determination operation 234 determines whether the IMS registration was successful. If registration determination operation 234 determines the IMS registration was not successful, then registration determination operation 234 branches to response operation 226 where a response is sent back to the client indicating the user credentials were not properly verified. If registration determination operation 234 determines the IMS registration was successful, then registration determination operation 234 branches to binding operation 236 where a binding is created for the authenticated and registered user. Response operation 238 then responds back to the client with a message indicating the authentication was successful. Waiting operation 240 then waits for the next message from the client, but at this point, the secure end-to-end communications with the client 105 may be performed via the IMS network 130. And, as can be seen from the above, the system need not employ traditional IMS authentication for certain third party applications or services.

Figure 3:
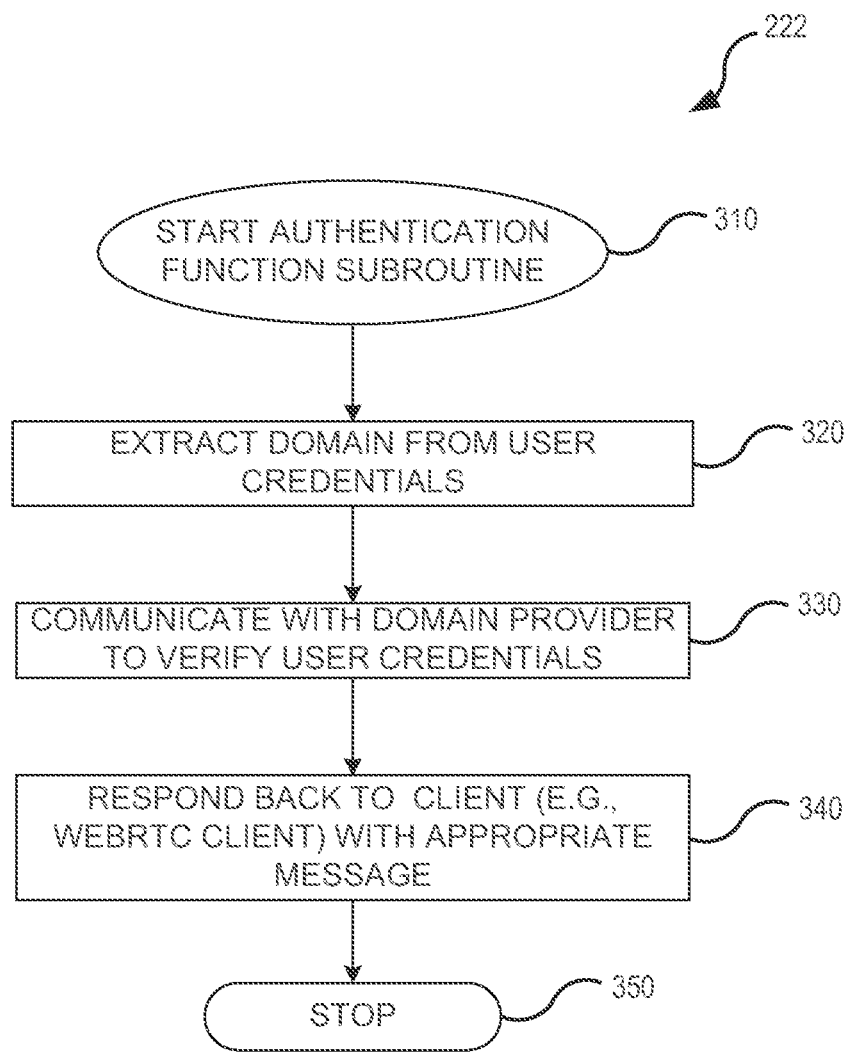
FIG. 3 is a flowchart illustrating a set of operations for operating an authentication function in accordance with various embodiments of the present invention.

FIG. 3 is a flowchart illustrating a set of operations 222 for operating an authentication function in accordance with various embodiments of the present invention. Initiation operation 310 starts the authentication function subroutine which may be running on authentication server 120. Extraction operation 320 extracts the domain from the user credentials and communicates with the domain provider to verify the user credentials during communication operation 330. Once the authentication status has been received from the domain provider, response operation 340 responds to the client (e.g., WebRTC client) with an appropriate message (e.g., verified or not verified) regarding the authentication status. Once the appropriate message is sent to the client, stopping operation 350 ends the authentication subroutine.

Figure 4:
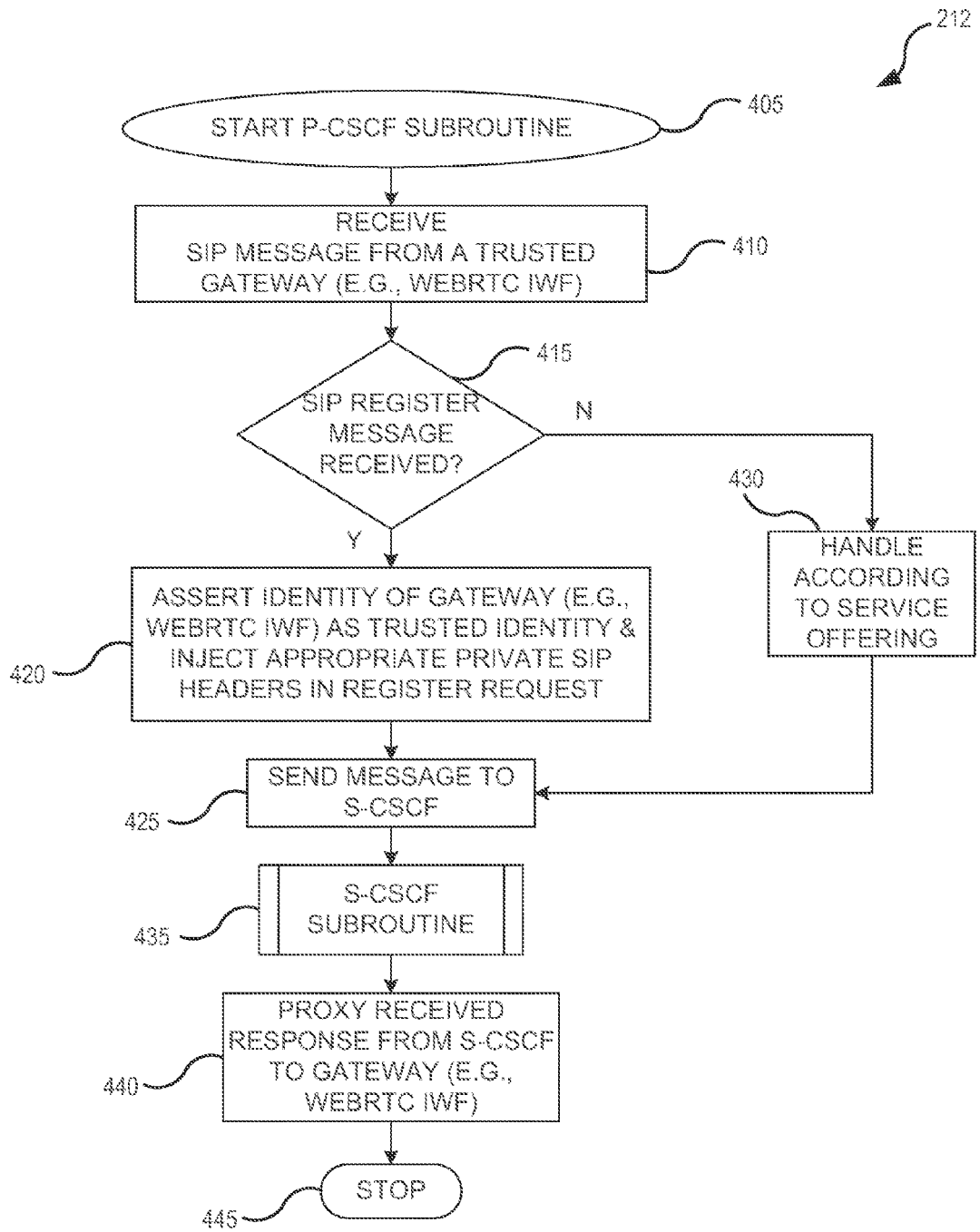
FIG. 4 is a flowchart illustrating a set of operations for operating a proxy control session control function in accordance with one or more embodiments of the present invention.

FIG. 4 is a flowchart illustrating a set of operations 212 for operating a P-CSCF in accordance with one or more embodiments of the present invention. As illustrated in FIG. 4, initiation operation 405 starts the P-CSCF subroutine. A SIP message is received from the gateway (e.g., a WebRTC IWF) during receiving operation 410. Determination operation 415 determines if the SIP message is a SIP REGISTER message. If determination operation 415 determines that the SIP message is a SIP REGISTER message, then determination operation 415 branches to assertion operation 420. During assertion operation 410 the identity of the gateway is asserted as a trusted identity and private SIP headers are injected into the register message before the messages is sent to the S-CSCF during sending operation 425. If determination operation 415 determines that the SIP message is not a SIP REGISTER message, then determination operation 415 branches to handling operation 430 where the message is handled according to the service offering before sending operation 425 sends the message to the S-CSCF.

The S-CSCF subroutine (see FIG. 5) executes service logic during execution operation 435 to bind the user location (e.g., the IP address of the endpoint) and the SIP address. In other cases, the service logic may determine which application server(s) the SIP message will be forwarded in order to provide the appropriate IMS services. Once the binding is complete or a response is received from the services, forwarding operation 440 forwards the response to the gateway before stopping the P-CSCF subroutine during stopping operation 445.

Figure 5:
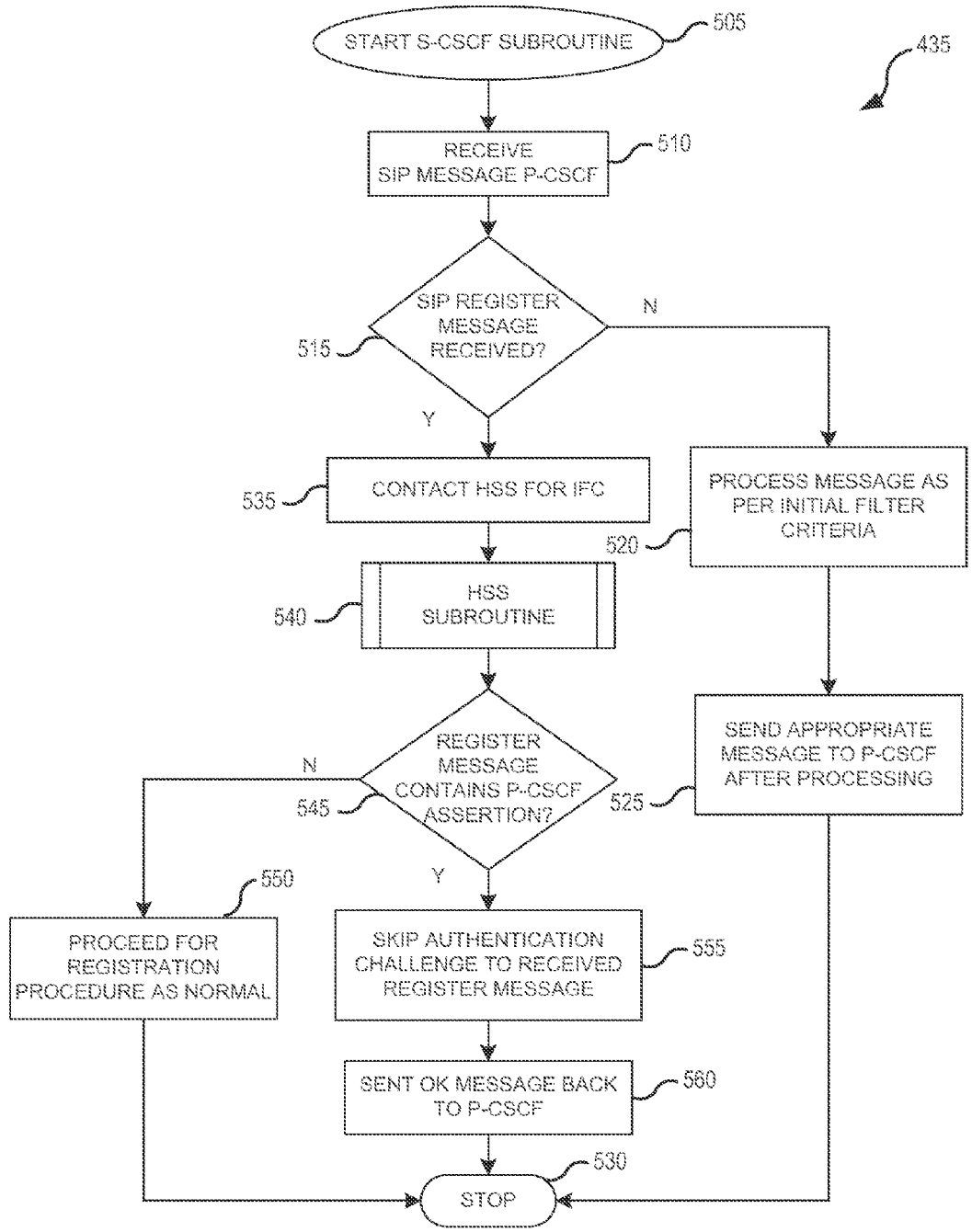
FIG. 5 is a flowchart illustrating a set of operations for operating a serving control session control function in accordance with some embodiments of the present invention.

FIG. 5 is a flowchart illustrating a set of operations 435 for operating an S-CSCF (or I-SCSF) in accordance with some embodiments of the present invention. Initiation operation 505 starts the S-CSCF subroutine. A SIP message may be received from the P-CSCF during receiving operation 510. Determination operation 515 determines whether the SIP message is a SIP REGISTER message. If determination operation 515 determines that the SIP message is not a SIP REGISTER message, then determination operation 515 branches to process operation 520 where the message is processed according to an iFC previously downloaded during the registration process. The iFC may be stored, for example, in an HSS as part of an IMS subscription profile. The iFC may be downloaded to the S-CSCF upon user registration (e.g., for registered users) or on processing demand (e.g., for services acting as unregistered users). After the message is processed, sending operation 525 sends an appropriate response message to the P-CSCF before the S-CSCF subroutine is terminated during stopping operation 530.

If determination operation 515 determines that the SIP message is a SIP REGISTER message, then determination operation 515 branches to contact operation 535 where the HSS is contacted and an HSS subroutine, to determine the appropriate filter criteria (see FIG. 6), is activated during activation operation 540. Assertion determination operation 545 determines whether the register message contains a P-CSCF assertion and that the registration request originated from a trusted source that has already verified the user credentials. If assertion determination operation 545 determines that the register message does not include the assertion, then assertion determination operation 545 branches to normal registration operation 550 where a traditional registration procedure is followed. If assertion determination operation 545 determines that the register message does include the assertion, then assertion determination operation 545 branches to skip operation 555 where the authentication challenge is skipped and sending operation 560 sends an OK message back to the P-CSCF.

Figure 6:
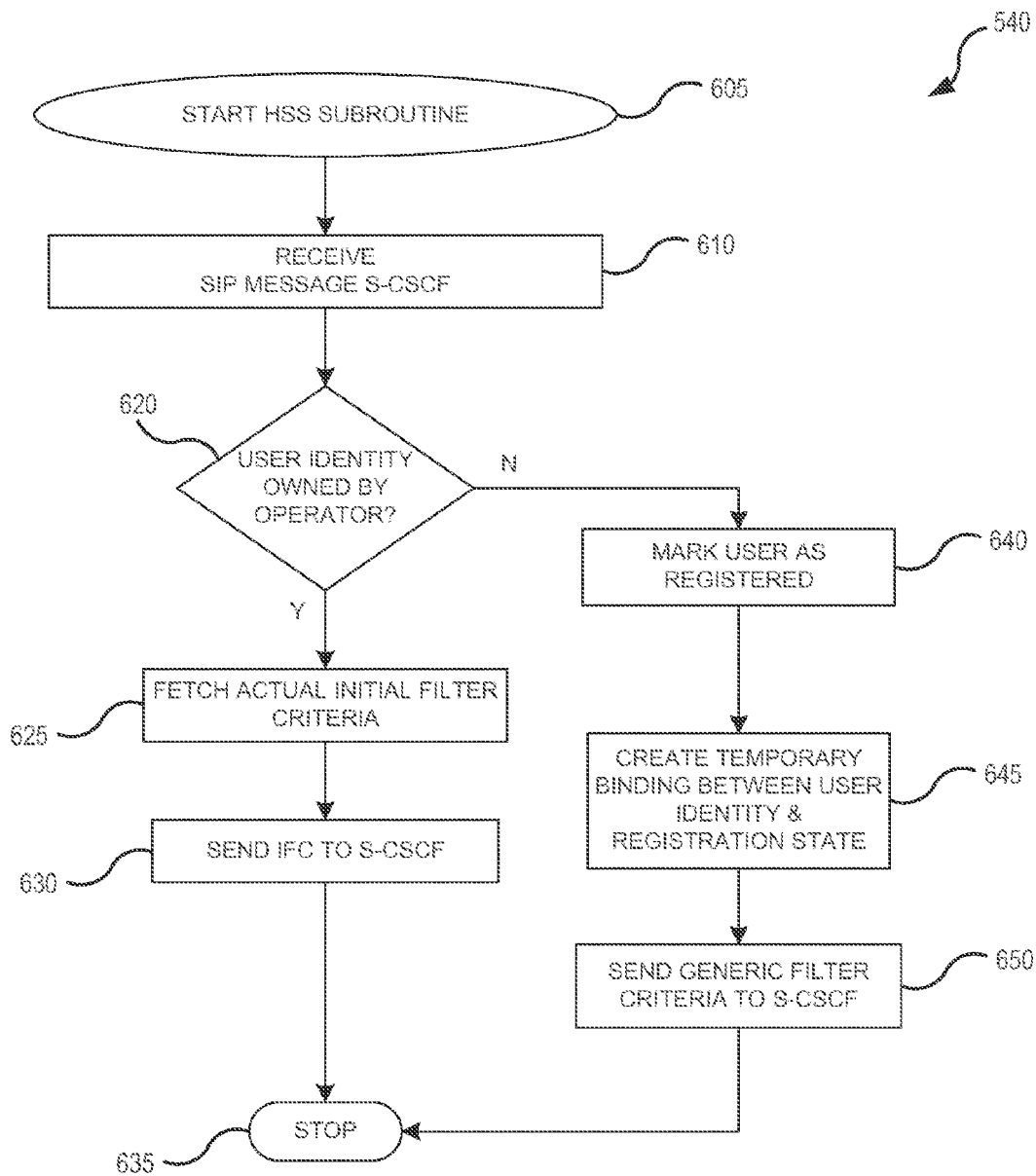
FIG. 6 is a flowchart illustrating a set of operations for operating a home subscriber server in accordance with at least one embodiment of the present invention.

FIG. 6 is a flowchart illustrating a set of operations 540 for operating a home subscriber server in accordance with at least one embodiment of the present invention. The HSS subroutine is activated during activation operation 605. The SIP message is received from the S-CSCF during receiving operation 610. Determination operation 620 determines whether the user identified within the SIP message is owned by the operator of the IMS network. If determination operation 620 determines that the user identity is owned by the operator of the IMS network, then determination operation 620 branches to fetching operation 625 where the actual iFC are retrieved from a database. The actual iFC are then sent to the S-CSCF using sending operation 630 and the HSS subroutine is terminated during stopping operation 635.

If determination operation 620 determines that the user identity is not owned by the operator of the IMS network, then determination operation 620 branches to marking operation 640 where the user is marked as registered and binding operation 645 creates a temporary binding between the user identity and the registration state. Sending operation 650 then sends a set of generic filter criteria to the S-CSCF. After the message is sent, the HSS subroutine is terminated during stopping operation 635.

Exemplary Computer System Overview

Figure 7:
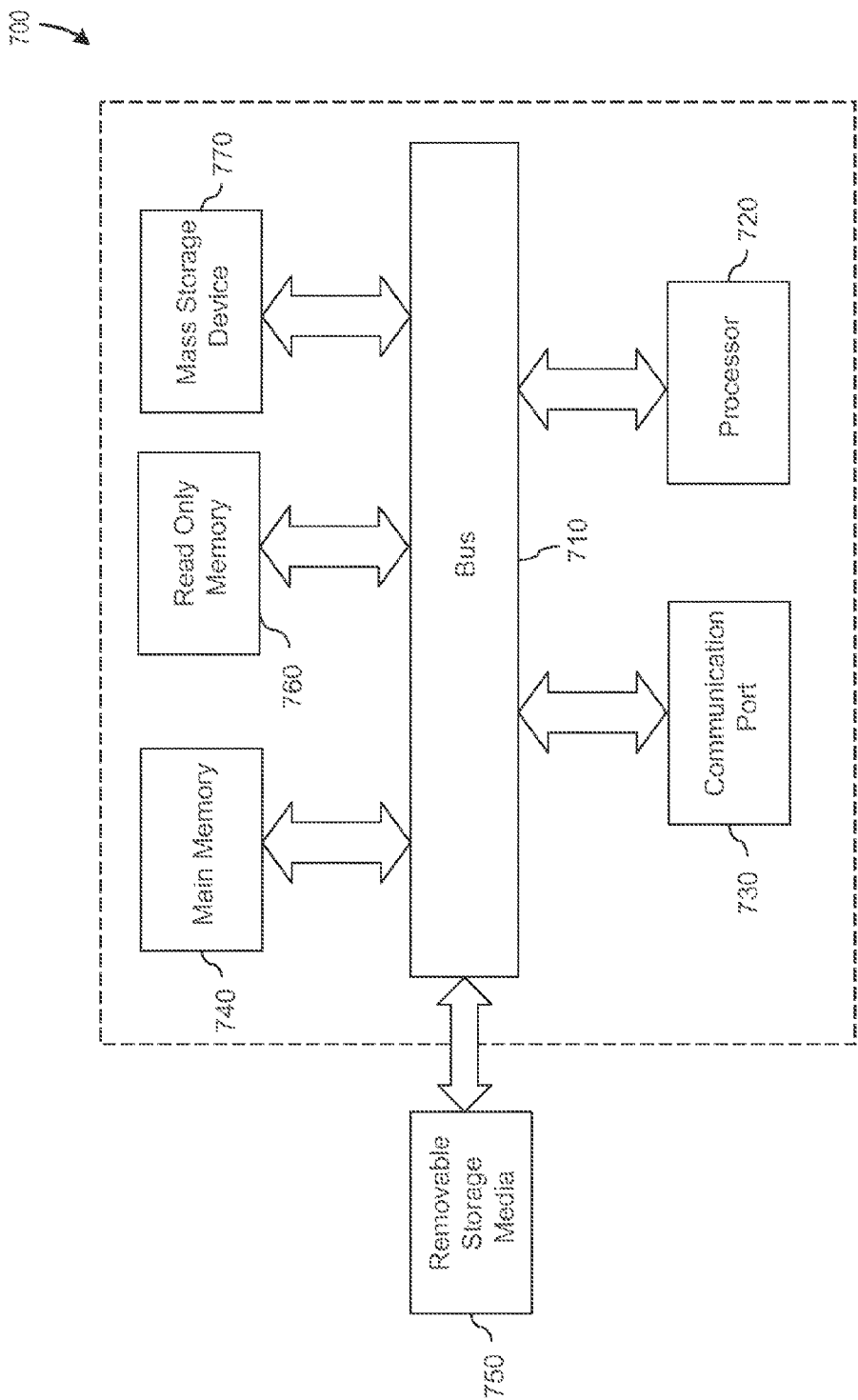
FIG. 7 illustrates an example of a computer system with which some embodiments of the present invention may be utilized.

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present invention may be utilized. According to the present example, the computer system includes a bus 710, at least one processor 720, at least one communication port 730, a main memory 740, a removable storage media 750, a read only memory 760, and a mass storage 770.

Processor(s) 720 can be any known processor, such as, but not limited to, ARM or x86-type processors, such as an Intel® Itanium® or Itanium 2® processor(s); AMD® Opteron® or Athlon MP® processor(s); or Motorola® lines of processors. Communication port(s) 730 can be any of an RS-232 port for use with a modem-based dialup connection, a 10/100 Ethernet port, or a Gigabit port using copper or fiber. Communication port(s) 730 may be chosen depending on a network such as a Local Area Network (LAN), Wide Area Network (WAN), or any network to which the computer system 700 connects. The communication port 730 may also encompass wireless communications components, such as an IEEE 802.11, 3G/4G or other wireless transceiver.

Main memory 740 can be Random Access Memory (RAM) or any other dynamic storage device(s) commonly known in the art. Read only memory 760 can be any static storage device(s) such as Programmable Read Only Memory (PROM) chips for storing static information such as instructions for processor 720.

Mass storage 770 can be used to store information and instructions. For example, hard disks such as the Adaptec® family of SCSI drives, an optical disc, an array of disks such as RAID, such as the Adaptec family of RAID drives, or any other mass storage devices may be used.

Bus 710 communicatively couples processor(s) 720 with the other memory, storage and communication blocks. Bus 710 can be a PCI/PCI-X or SCSI based system bus depending on the storage devices used.

Removable storage media 750 can be any kind of external hard-drives, floppy drives, IOMEGA® Zip Drives, Compact Disc-Read Only Memory (CD-ROM), Compact Disc-Re-Writable (CD-RW), and/or Digital Video Disk-Read Only Memory (DVD-ROM).

The components described above are meant to exemplify some types of possibilities. In no way should the aforementioned examples limit the scope of the invention, as they are only exemplary embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a computer-readable medium claim, other aspects may likewise be embodied as a computer-readable medium claim, or in other forms, such as being embodied in a means-plus-function claim. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

What is claimed is:

1. A method comprising:
   receiving, at a gateway, a request from a device to establish a service connection between the device and an endpoint through an Internet Protocol Multimedia Subsystem (IMS) session,
      wherein the request includes third-party domain credentials associated with an end-user, and
      wherein the third-party domain credentials are maintained by a third-party domain;
   determining, at the gateway, whether the request has already been authenticated;
   in response to determining the request has already been authenticated:
      sending, via the gateway, a session initiation protocol (SIP) message to an IMS network based on the request;
      sending, via the gateway, a response to the device based on the request;
   in response to determining the request has not already been authenticated:
   extracting, at the gateway, the third-party domain credentials from the request received from the device;
   establishing, via the gateway, a trust relationship with the third-party domain to enable the third-party credentials to be authenticated,
      wherein a trust relationship exists between the gateway and the IMS network;
   communicating, via the gateway, the third-party domain credentials to the third-party domain to verify the third-party domain credentials; and,
   establishing the IMS session between the initiating device and the endpoint upon verification of the third-party domain credentials based on the end user's third-party domain credentials, authenticated by the third-party domain, to authenticate use of an IMS core network by the end-user, to thereby authenticate use of the IMS core network, without the need for further validation of credentials of the end-user because of the trust relationship between the gateway and the IMS core network,
      wherein establishing the IMS session includes the gateway sending a SIP REGISTER message on behalf of the initiating device to a component of the IMS network,
      wherein the SIP REGISTER message indicates the message is from a trusted source.

2. The method of claim 1, wherein the received request is a request to establish a real-time or near real-time service connection, wherein the request to establish the IMS session originates from a generic web front end that allows web browsers to conduct real-time communication, wherein the third-party domain credentials include credentials supplied by the end-user, and wherein the generic web front end is a Web Real Time Communications (WebRTC) client configured to communicate with a WebRTC Interworking Function using HTTPS over the Internet.

3. The method of claim 1, wherein the received request is a request to establish a real-time or near real-time service connection, and wherein the request to establish the IMS session originates from a generic web front end that allows web browsers to conduct real-time communication.

4. The method of claim 2, wherein the real-time service includes white board discussions, video conferencing, Push to talk over Cellular (PoC), Voice over IP (VoIP), real-time content sharing, instant messaging, or interactive gaming.

5. The method of claim 1, wherein the SIP REGISTER message includes private headers that indicate the message is from a trusted source.

6. The method of claim 1, wherein establishing the IMS session between the initiating device and the endpoint, upon verification of the third-party domain credentials, includes registering the end-user with the IMS and translating WebRTC events into SIP messages.

7. The method of claim 1, wherein the received registration message originates from a generic web front end that enables web browsers to conduct real-time communication, wherein the third-party domain credentials include credentials supplied by the end-user, and wherein the generic web front end is a Web Real Time Communications (WebRTC) client configured to communicate with a WebRTC Interworking Function using HTTPS over the Internet.

8. A non-transitory computer-readable medium storing instructions that, when executed by one or more processors, cause the processors to:
   receive, at a gateway, from a WebRTC client, a registration message to establish a real-time service between a first endpoint and a second endpoint through an Internet Protocol Multimedia Subsystem (IMS) core network,
      wherein the registration message includes third-party domain credentials for an end user; and
      wherein the end user's third-party domain credentials are maintained and authenticated by the third-party domain;
   parse the registration message to determine the third-party domain and the third-party domain credentials;
   establish, via the gateway, a trust relationship with the IMS core network via the third-party domain to enable the third-party credentials to be authenticated using the third-party domain, by
      submitting, via the gateway, the third-party domain and third-party domain credentials for authentication by the third-party domain; and
      receiving an authentication status indicating the third-party domain credentials have been successfully authenticated;
   generate, via the gateway, a SIP REGISTER message on behalf of the end user; and
   submit, via the gateway, the SIP REGISTER message to the IMS core network to thereby establish a real-time service between the first endpoint and the second endpoint through the IMS core network using the end user's third-party domain credentials, authenticated by the third-party domain, to authenticate use of the IMS core network, and without the need for further validation of credentials of the end-user because of the trust relationship between the gateway and the IMS network.

9. The non-transitory computer-readable medium of claim 8, wherein the real-time service includes white board discussions, video conferencing, Push to talk over Cellular (PoC), Voice over IP (VoIP), real-time content sharing, instant messaging, or interactive gaming.

10. The non-transitory computer-readable medium of claim 8, wherein the instructions when executed further cause the one or more processors to submit the SIP REGISTER message to a proxy call session control function (P-CSCF) within the IMS core network to determine if the SIP REGISTER message originates from a trusted source.

11. The non-transitory computer-readable medium of claim 10, wherein the instructions when executed further cause the P-CSCF to assert that the SIP REGISTER message is from the trusted source by inserting private headers into the SIP REGISTER message before forwarding the message to a serving call session control function (S-CSCF) to create a binding between the first endpoint and the second endpoint.

12. The non-transitory computer-readable medium of claim 8, wherein the instructions when executed further cause the one or more processors to translate WebRTC events received from the WebRTC client into SIP messages.

13. A method comprising:
receiving, at a gateway, a request from an initiating device to establish a service connection between the initiating device and an endpoint through an Internet Protocol Multimedia Subsystem (IMS) session,
wherein the request includes third-party domain credentials associated with an end-user, and
wherein the user's third-party domain credentials are maintained by a third-party domain;
delegating authentication of the end-user to a gateway;
communicating, via the gateway, with the third-party domain to verify the third-party domain credentials;
establishing, via the gateway, a trust relationship with the third-party domain to enable the third-party credentials to be authenticated using the third-party domain;
establishing the IMS session between the initiating device and the endpoint based on the end user's third-party domain credentials, authenticated by the third-party domain, to authenticate use of an IMS core network by the end-user, to thereby authenticate use of the IMS core network, without the need for further validation of credentials of the end-user because of a trust relationship between the gateway and the IMS core network;
wherein establishing the IMS session includes the gateway sending a SIP REGISTER message on behalf of the initiating device to a component of the IMS network,
wherein the SIP REGISTER message indicates the message is from a trusted source; and
suppressing any challenge from the IMS network to the authentication based on the trust relationship already established between the gateway and the end-user.

14. The method of claim 13, wherein the request to establish the service connection originates from a generic web front end that allows web browsers to conduct real-time communication, wherein the third-party domain credentials include credentials supplied by the end-user, and wherein the generic web front end is a Web Real Time Communications (WebRTC) client configured to communicate with a WebRTC Interworking Function using HTTPS over the Internet.

15. The method of claim 14, further comprising: translating WebRTC events received from the WebRTC client into SIP messages.

16. The method of claim 13, wherein the request is a request to establish a real-time or near real-time service connection, and wherein the request to establish the IMS session originates from a generic web front end that allows web browsers to conduct real-time communication.

17. The method of claim 13, wherein contacting the IMS network to establish the IMS session between the initiating device and the endpoint upon verification of the third-party domain credentials includes originating a SIP REGISTER message that includes private headers indicating the message is from a trusted source.

18. The method of claim 13, wherein contacting the IMS network to establish the IMS session between the initiating device and the endpoint upon verification of the third-party domain credentials includes registering the end-user with the IMS and translating WebRTC events into SIP messages.

19. A non-transitory computer-readable medium storing instructions that, when executed by one or more processors, cause a machine to:
receive, at a gateway, a request from an initiating device to establish a service connection between the initiating device and an endpoint through an Internet Protocol Multimedia Subsystem (IMS) session,
wherein the request includes third-party domain credentials associated with an end-user, and
wherein the end-user's third-party domain credentials are maintained by a third-party domain;
delegate authentication of the end-user to a gateway, wherein the gateway communicates with the third-party domain to verify the third-party domain credentials;
establish, via the gateway, a trust relationship with the third-party domain to enable the third-party credentials to be authenticated using the third-party domain;
receive the authentication generated by the gateway;
establish the IMS session between the initiating device and the endpoint based on the end user's third-party domain credentials, authenticated by the third-party domain, to authenticate use of an IMS core network by the end-user, to thereby authenticate use of the IMS core network, without the need for further validation of credentials of the end-user because of the trust relationship established between the gateway and the IMS core network;
wherein establishing the IMS session includes the gateway sending a SIP REGISTER message on behalf of the initiating device to a component of the IMS network,
wherein the SIP REGISTER message indicates the message is from a trusted source; and
suppress any challenge from the IMS network to the authentication based on the trust relationship already established between the gateway and the end-user.

20. The non-transitory computer-readable medium of claim 19, further storing instructions that, when executed by the one or more processors, cause the machine to contact the IMS network to establish the IMS session between the initiating device and the endpoint upon verification of the third-party domain credentials by originating a SIP REGISTER message that includes private headers indicating the message is from a trusted source.

21. The non-transitory computer-readable medium of claim 19, further storing instructions that, when executed by the one or more processors, cause the machine to establish the IMS session between the initiating device and the endpoint upon verification of the third-party domain credentials and includes registering the end-user with the IMS and translating WebRTC events into SIP messages.

* * * * *